United States Patent
Hirano et al.

(10) Patent No.: US 10,544,832 B2
(45) Date of Patent: Jan. 28, 2020

(54) PRELOAD GUIDE SYSTEM AND ROTATION STRUCTURE

(71) Applicant: Mitsubishi Electric Corporation, Chiyoda-ku (JP)

(72) Inventors: Masaki Hirano, Chiyoda-ku (JP); Noboru Kawaguchi, Chiyoda-ku (JP); Junji Takaki, Chiyoda-ku (JP); Yutaka Ezaki, Chiyoda-ku (JP); Makoto Endo, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/148,328

(22) Filed: Oct. 1, 2018

(65) Prior Publication Data

US 2019/0107151 A1 Apr. 11, 2019

Related U.S. Application Data

(60) Provisional application No. 62/569,166, filed on Oct. 6, 2017.

(51) Int. Cl.
*F16C 32/06* (2006.01)

(52) U.S. Cl.
CPC ...... *F16C 32/0692* (2013.01); *F16C 32/0648* (2013.01)

(58) Field of Classification Search
CPC ........ F16C 17/06; F16C 17/065; F16C 17/32; F16C 17/0644; F16C 17/0648; F16C 17/0666; F16C 17/0674; F16C 17/0692; G02B 7/00; G02B 7/183
See application file for complete search history.

(56) References Cited

U.S. PATENT DOCUMENTS

| | | | | |
|---|---|---|---|---|
| 3,734,581 A | * | 5/1973 | LeBreton | F16C 17/06 384/304 |
| 3,799,628 A | * | 3/1974 | Van Gaasbeek | F04B 1/2042 384/12 |
| 3,994,367 A | * | 11/1976 | Christ | F16C 32/0666 184/5 |
| 4,073,549 A | * | 2/1978 | Christ | F16C 32/0666 384/122 |

(Continued)

OTHER PUBLICATIONS

Ezaki, Y. et al. "Overview of key technologies for TMT telescope structure," Proc. of SPIE, vol. 9906, 2016, pp. 16.

(Continued)

*Primary Examiner* — Phillip A Johnson
(74) *Attorney, Agent, or Firm* — Oblon, McClelland, Maier & Neustadt, L.L.P.

(57) ABSTRACT

A preload guide system guides, in a horizontal plane, movement of a rotation structure having journals rotating around a rotation axis having a horizontal rotation shaft. At right-side surfaces of the journals, guide bearing components press predetermined positions on the same side with respect to an axial-direction reference plane and rotatably support the journals. At left-side surfaces of the journals, guide bearing components press positions corresponding to the guide bearing components at the right side surfaces, and rotatably support the journals. The support systems adjust displacement amounts of the guide bearing components such that a sum of the displacement amounts becomes zero.

20 Claims, 10 Drawing Sheets

(56) References Cited

U.S. PATENT DOCUMENTS

| | | | | |
|---|---|---|---|---|
| 4,099,802 | A | * | 7/1978 | Heinemann ......... F16C 32/0666 |
| | | | | 384/122 |
| 4,892,412 | A | * | 1/1990 | Thomas ................. B01F 9/002 |
| | | | | 366/145 |
| 8,328,423 | B2 | | 12/2012 | Tomelleri |
| 2004/0057642 | A1 | * | 3/2004 | New ................... F16C 32/0666 |
| | | | | 384/122 |
| 2010/0329593 | A1 | * | 12/2010 | Tomelleri ............ F16C 32/0659 |
| | | | | 384/12 |

OTHER PUBLICATIONS

Ezaki, Y. et al. "Key Technologies for Ultra Large Optical Infrared Astronomical Telescope TMT," pp. 4 (with partial translation).

* cited by examiner

PRELOAD GUIDE SYSTEM AND ROTATION STRUCTURE

CROSS-REFERENCE TO RELATED APPLICATION

This application claims the benefit of U.S. Provisional Application No. 62/569,166, filed on Oct. 6, 2017, and is based on Japanese Patent Application No. 2015-144193, the entire disclosures of which are incorporated by reference herein.

FIELD

The present disclosure relates to a preload guide system and a rotation structure, and particularly relates to a preload guide system for guiding movement of a rotation structure in a horizontal plane, and to the rotation structure.

BACKGROUND

U.S. Pat. No. 8,328,423, for example, discloses a preload guide system for supporting from both side surfaces each of two journals for rotational driving of a large-sized rotation structure to restrict each of the journals to a predetermined position. The preload guide system disclosed in U.S. Pat. No. 8,328,423 includes two independent preload support systems. Each of the preload support systems connects bearings supporting the same surface of two journals with preloading, and adjusts preloading applied to the journals of the large-sized rotation structure. The providing of the two independent preload support systems enables return to a position determined originally even when mispositioning of the journal occurs in an axial direction due to factors such as thermal deformation induced by temperature change or weight of the large-sized rotation structure.

SUMMARY

The preload guide system disclosed in U.S. Pat. No. 8,328,423 can prevent mispositioning of the journal in the axial direction. However, it is difficult to prevent mispositioning of the journals due to rotation of the rotation structure within a horizontal plane. Thus a preload guide system is desired that can prevent mispositioning of the rotation structure within the horizontal plane in addition to preventing mispositioning in the journal axial direction.

In order to solve the aforementioned problem, an objective of the present disclosure is to provide a preload guide system and a rotation structure that can, in addition to preventing mispositioning in an axial direction of the journals, prevent mispositioning of the journals due to rotation of the rotation structure in a horizontal plane.

The preload guide system according to the present disclosure guides movement of a rotation structure in a horizontal plane. The rotation structure has a horizontal rotation axis, a first journal arranged perpendicular to the rotation axis, and a second journal disposed at a predetermined spacing in a direction of the rotation axis from the first journal and arranged perpendicular to the rotation axis, and the rotation structure rotates around the rotation axis. The preload guide system includes first to eighth guide bearing components and first to fourth support positioning mechanisms.

The first guide bearing component presses a predetermined position of a first side surface of the first journal and rotatably supports the first journal, the first side surface being at the side of the first journal at which the second journal does not exist.

The second guide bearing component presses a predetermined position of a second side surface of the first journal and rotatably supports the first journal, the second side surface being at the side of the first journal at which the second journal exists, the predetermined position of the second side surface corresponding to the predetermined position pressed by the first guide bearing component.

The third guide bearing component presses a predetermined position of the first side surface and rotatably supports the first journal, the predetermined position being opposite to the predetermined position pressed by the first guide bearing component with respect to an axial-direction reference plane that is a vertical plane including the rotation axis.

The fourth guide bearing component presses a predetermined position of the second side surface and rotatably supports the first journal, the predetermined position of the second side surface corresponding to the predetermined position pressed by the third guide bearing component.

The fifth guide bearing component presses a predetermined position of a third side surface of the second journal and rotatably supports the second journal, the third side surface being at the side of the second journal at which the first journal exists, the predetermined position being at the same side as the predetermined position pressed by the first guide bearing component with respect to the axial-direction reference plane.

The sixth guide bearing component presses a predetermined position of a fourth side surface of the second journal and rotatably supports the second journal, the fourth side surface being at the side of the second journal at which the first journal does not exist, the predetermined position of the fourth side surface corresponding to the predetermined position pressed by the fifth guide bearing component.

The seventh guide bearing component presses a predetermined position of the third side surface and rotatably supports the second journal, the predetermined position of the third side surface being opposite to the predetermined position pressed by the fifth guide bearing component with respect to the axial-direction reference plane.

The eighth guide bearing component presses a predetermined position of the fourth side surface and rotatably supports the second journal, the predetermined position of the fourth side surface corresponding to the predetermined position pressed by the seventh guide bearing component.

The first support positioning mechanism adjusts a displacement amount of the first guide bearing component and a displacement amount of the fifth guide bearing component such that a sum of the displacement amount of the first guide bearing component and the displacement amount of the fifth guide bearing component becomes zero.

The second support positioning mechanism adjusts a displacement amount of the second guide bearing component and a displacement amount of the sixth guide bearing component such that a sum of the displacement amount of the second guide bearing component and the displacement amount of the sixth guide bearing component becomes zero.

The third support positioning mechanism adjusts a displacement amount of the third guide bearing component and a displacement amount of the seventh guide bearing component such that a sum of the displacement amount of the third guide bearing component and the displacement amount of the seventh guide bearing component becomes zero.

The fourth support positioning mechanism adjusts the displacement amount of the fourth guide bearing component and a displacement amount of the eighth guide bearing component such that a sum of the displacement amount of the fourth guide bearing component and the displacement amount of the eighth guide bearing component becomes zero.

In addition to preventing mispositioning in the axial direction of the first and second journals, the present disclosure enables prevention of mispositioning of the first and second journals due to rotation of the rotation structure within the horizontal plane. Thus a preload guide system and a rotation structure can be provided that can respond to both mispositioning due to rotation in the horizontal plane and mispositioning due to movement of the axial direction of the first and second journals, and that can thus prevent mispositioning appropriately.

BRIEF DESCRIPTION OF THE DRAWINGS

A more complete understanding of this application can be obtained when the following detailed description is considered in conjunction with the following drawings, in which.

DETAILED DESCRIPTION

A rotation structure according to an embodiment of the present disclosure is described with reference to FIG. 1 to FIG. 8. Further, for ease of understanding, XYZ coordinates are defined and referred to appropriately. The X axis is an axis parallel to a horizontal rotation axis. The Y axis is an axis perpendicular to the X axis in the horizontal plane. The Z axis is an axis perpendicular to the horizontal plane.

Figure 1A:
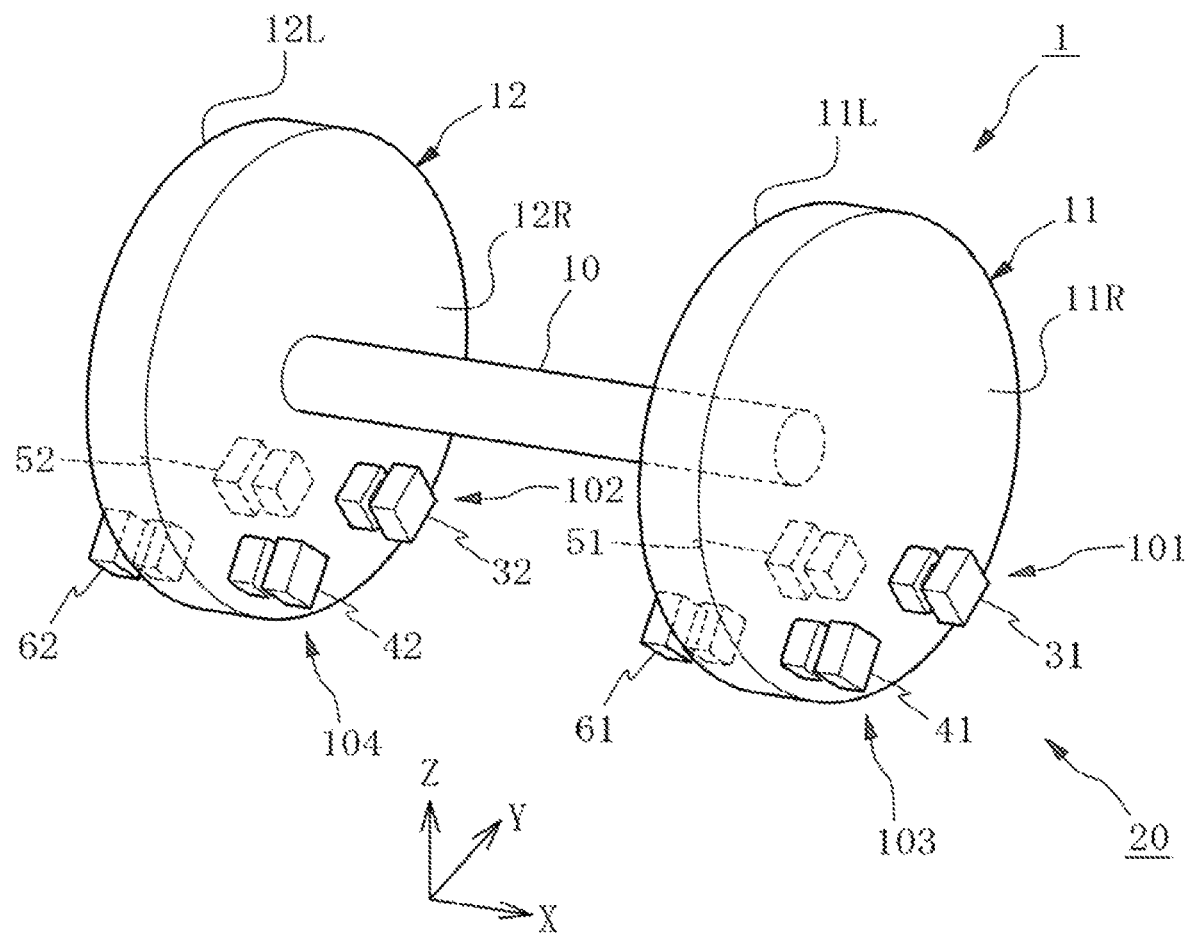
FIG. 1A is a perspective view of a rotation structure according to an embodiment of the present disclosure.
Figure 1B:
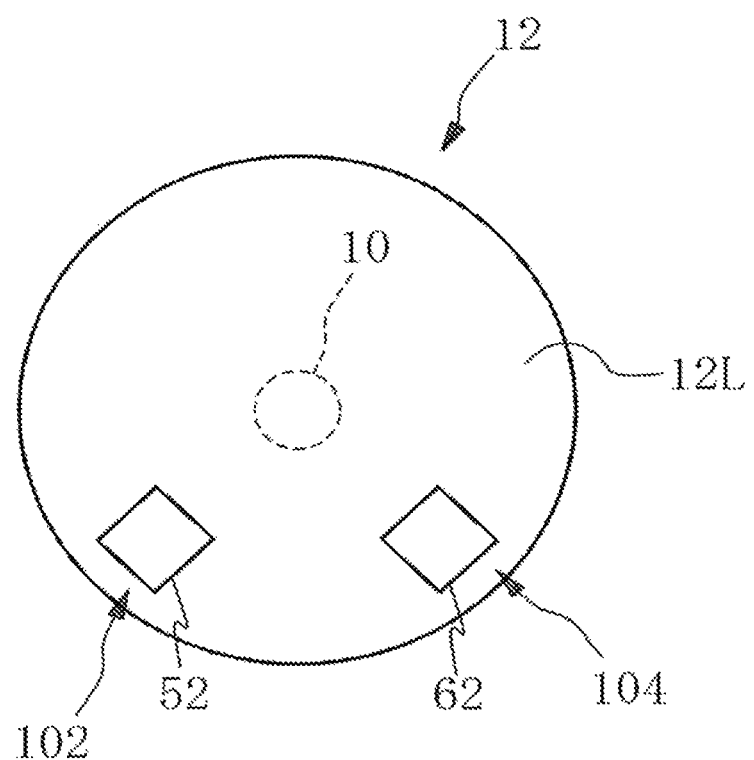
FIG. 1B is a left-side view of the rotation structure according to the embodiment.
Figure 1C:
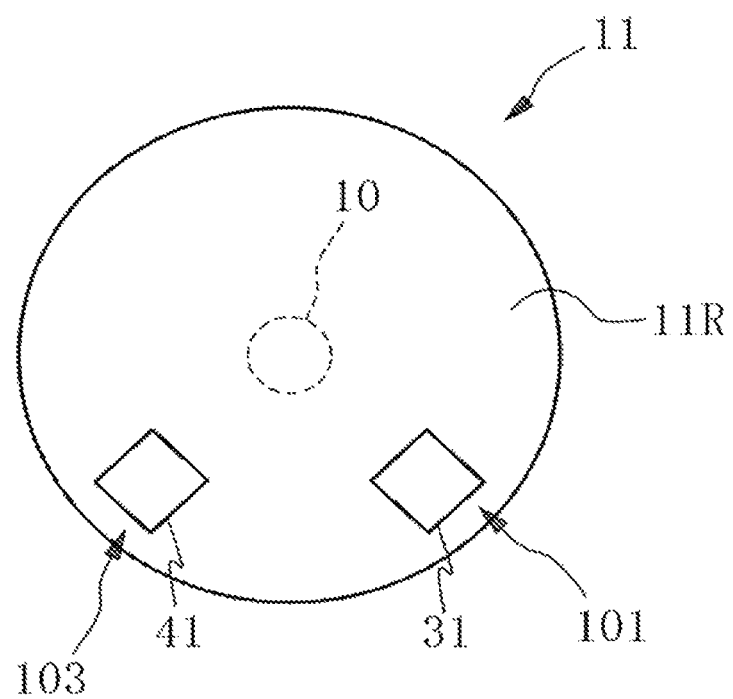
FIG. 1C is a right-side view of the rotation structure according to the embodiment.

As illustrated in FIG. 1A to FIG. 1C, a rotation structure 1 according to the present embodiment is equipped with a rotation shaft 10 forming a part of the rotation structure 1. A preload guide system 20 guides movement of the rotation structure 1 in the horizontal plane. The rotation structure 1 pivots or rotates around the rotation shaft 10 parallel to the X axis. The rotation structure 1, for example, is a large-size rotation structure for changing an elevation angle of a large-size telescope having a 30 meter-class (diameter) reflector. The axis of the rotation shaft 10 is an example of the rotation axis of the present disclosure. Although the rotation structure 1 in the present embodiment is equipped with the rotation shaft 10 as a physical object as an aspect of the present disclosure, this aspect is not limited, and the rotation shaft 10 may be omitted in another aspect of the present disclosure.

At both ends of the rotation shaft 10, the rotation structure 1 is provided with two journals 11 and 12 arranged perpendicular to the axial direction of the rotation shaft 10. The journals 11 and 12, rather than being arranging at both the ends of the rotation shaft 10, may be arranged at any positions separated by the predetermined spacing. The journals 11 and 12 have cylindrically-shaped outer circumferential surfaces, and are rotatably supported through both side surfaces at two locations, in the bottom portion thereof, symmetric with respect to the vertical direction. That is to say, the journals 11 and 12 are components of the rotatably supported rotation structure. Further, although the two journals 11 and 12 are included in the rotation structure 1 according to the present embodiment, this configuration is not limiting. The number of the journals 11 and 12 included in the rotation structure 1 may be any number greater than or equal to two.

Further, the journals 11 and 12, due to weight thereof, deform by spreading outwardly in the downward direction, for example by spreading downwardly in an "inverted split V" shape. Thus the journal 11 (first journal) is provided with the bearing units 101 and 103 that support two positions of the side surfaces in the bottom portion thereof. The journal 12 (second journal) is provided with the bearing units 102 and 104 that support two positions of the side surfaces in the bottom portion thereof. The bearing units 101 and 102 are arranged at locations projecting onto the same position in the YZ plane. The bearing unit 103 is arranged at a position symmetrical to the position of the bearing unit 101 with respect to an axial-direction reference plane that is a vertical plane parallel to the XZ plane and including the rotation shaft 10, and the bearing unit 104 is arranged at a position symmetrical to the position of the bearing unit 102 with respect to the axial-direction reference plane. Such arrangement enables the journals 11 and 12 to be supported in the same manner and enables symmetrical support with respect to the axial-direction reference plane.

Although the bearing units 101 and 102 are preferably arranged at positions that project to the same position in the YZ plane, arrangement at different positions is permissible within a range such that the effect of the present disclosure is obtained. Although the bearing units 103 and 104 are preferably arranged at positions that project to the same position in the YZ plane, arrangement at different positions is permissible within a range such that the effect of the present disclosure is obtained. Although the bearing units 101 and 103 are preferably arranged at positions that are symmetrical with respect to the axial-direction reference plane, arrangement at non-symmetrical positions is permissible within a range such that the effect of the present disclosure is obtained. Although the bearing units 102 and 104 are preferably arranged at positions that are symmetrical with respect to the axial-direction reference plane, arrangement at non-symmetrical positions is permissible within a range such that the effect of the present disclosure is obtained. The bearing units 101 and 103 may be located at the same side with respect to the axial-direction reference plane, and the bearing units 102 and 104 may be located at the side opposite to that of the bearing units 101 and 103 with respect to the axial-direction reference plane.

Figure 2:
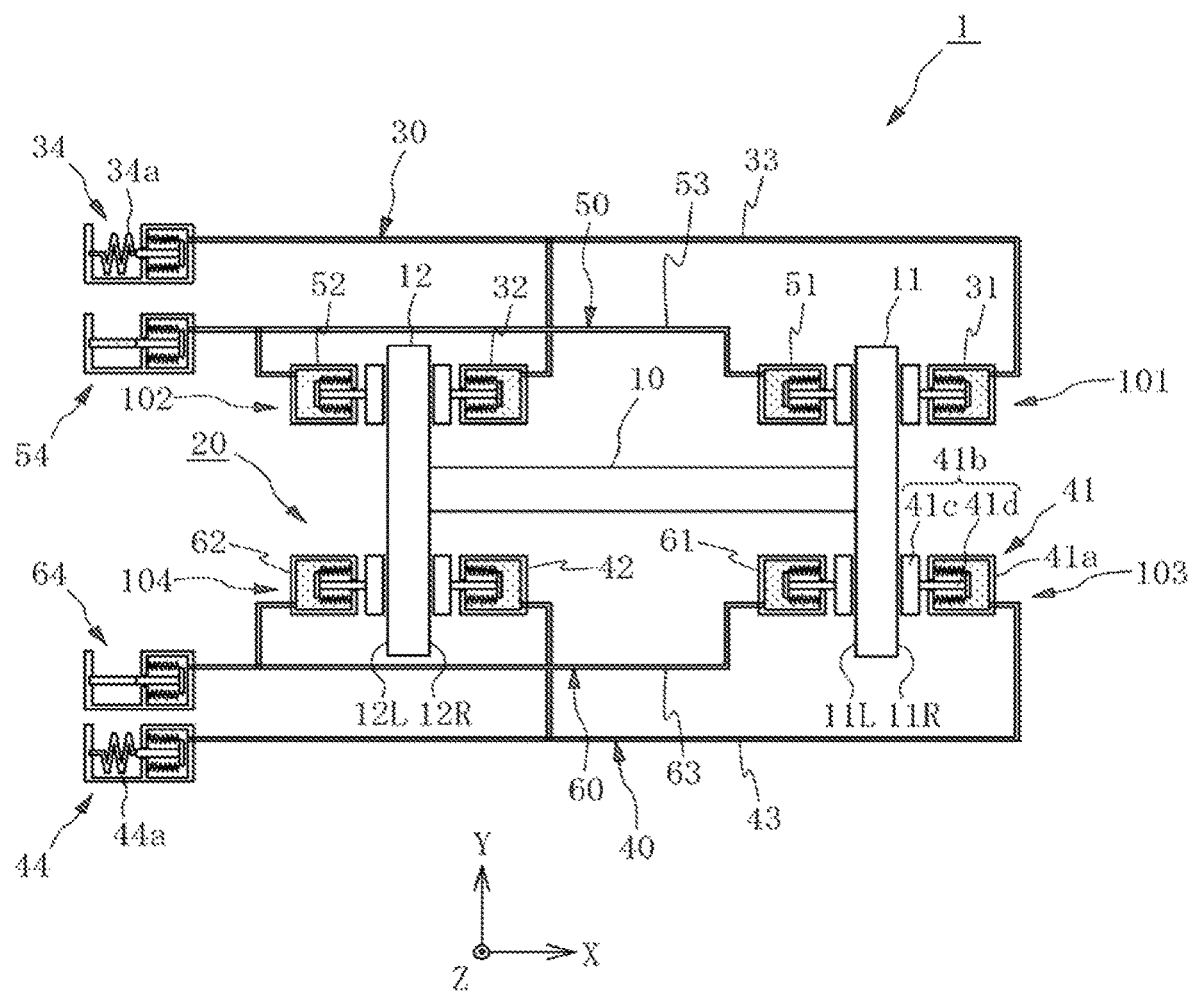
FIG. 2 is a schematic drawing illustrating a configuration of a preload guide system according to the embodiment.

FIG. 2 is a schematic drawing illustrating a configuration of the preload guide system 20 according to the embodiment of the present disclosure. As illustrated in FIG. 2, the preload guide system 20 is used for constraining the rotation structure 1 at a predetermined position by adjusting pressure applied to the journals 11 and 12 by the bearing units 101, 102, 103, and 104. The preload guide system 20 includes the bearing units 101, 102, 103, and 104, connecting tubes 33, 43, 53, and 63, preloading mechanisms 34 and 44, positioning mechanisms 54 and 64, and support systems 30, 40, 50, and 60.

The bearing unit 101 includes a guide bearing component 31 (a first guide bearing component) and a guide bearing component 51 (a second guide bearing component). The guide bearing component 31 and the guide bearing component 51 face each other and sandwich the journal 11 therebetween. The bearing unit 102 includes a guide bearing component 32 (a fifth guide bearing component) and a guide bearing component 52 (a sixth guide bearing component) that face each other and sandwich the journal 12 therebetween. The bearing unit 103 includes a guide bearing component 41 (a third guide bearing component) and a guide bearing component 61 (a fourth guide bearing component) that face each other and sandwich the journal 11 therebetween. The bearing unit 104 includes a guide bearing component 42 (a seventh guide bearing component) and a guide bearing component 62 (an eighth guide bearing component) that face each other and sandwich the journal 12 therebetween. The bearing units 101, 102, 103, and 104 are arranged on a structural object fixed to the ground.

A right-side surface 11R (positive X-side surface, a first side surface) of the journal 11 is supported by the guide bearing components 31 and 41. A left-side surface 11L (negative X-side surface, a second side surface) of the journal 11 is supported by the guide bearing components 51 and 61. Further, a right-side surface 12R (positive X-side surface, a third side surface) of the journal 12 is supported by the guide bearing components 32 and 42. Further, a left-side surface 12L (negative X-side surface, a fourth side surface) of the journal 12 is supported by the guide bearing components 52 and 62.

The guide bearing component 31 and the guide bearing component 51 face each other, sandwich the journal 11 therebetween, and are located at the same position in the circumferential direction of the journal 11. Further, the guide bearing component 41 and the guide bearing component 61 face each other, sandwich the journal 11 therebetween, and are located at the same position in the circumferential direction of the journal 11. In a similar manner, the guide bearing component 32 and the guide bearing component 52 face each other, sandwich the journal 12 therebetween, and are located at the same position in the circumferential direction of the journal 12. The guide bearing component 42 and the guide bearing component 62 face each other, sandwich the journal 12 therebetween, and are located at the same position in the circumferential direction of the journal 12. The guide bearing component 31 and the guide bearing component 51 sandwich the journal 11 therebetween, and are located at corresponding positions. The guide bearing component 32 and the guide bearing component 52, the guide bearing component 41 and the guide bearing component 61, and the guide bearing component 42 and the guide bearing component 62 are located at mutually corresponding positions sandwiching the journal 11 or the journal 12.

Figure 3:
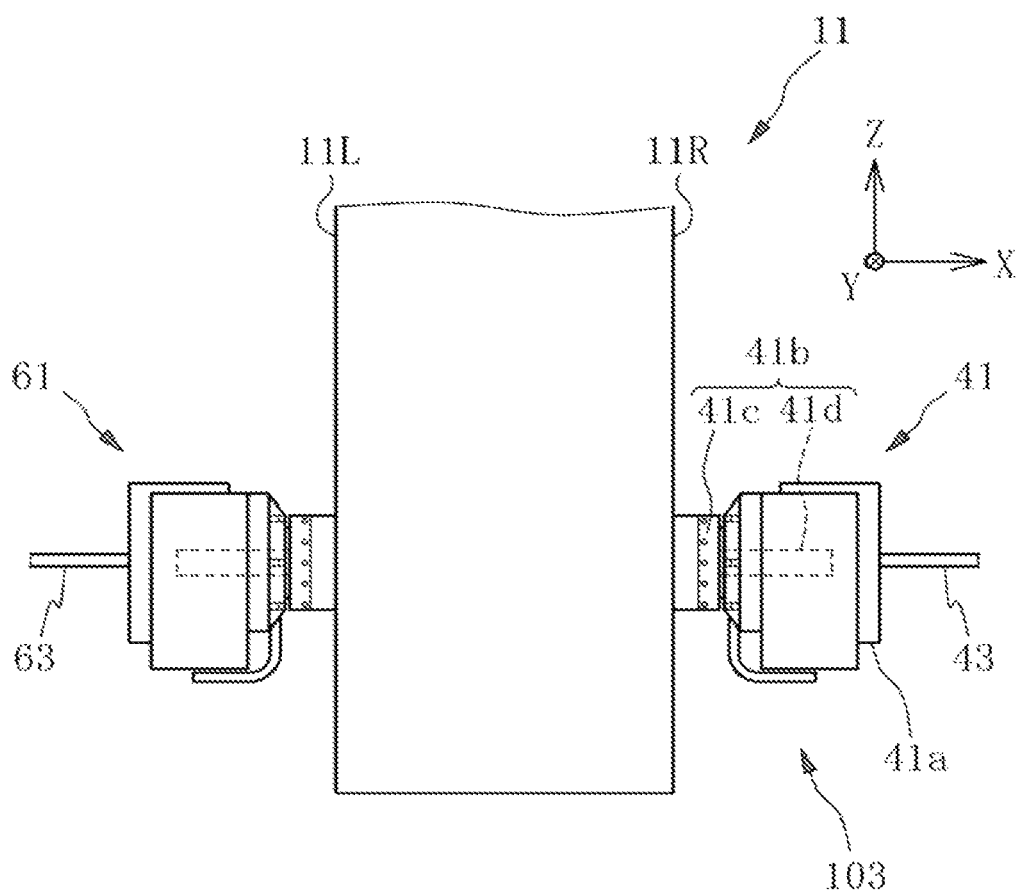
FIG. 3 is a front view of a journal and bearing units of the rotation structure according to the embodiment.

FIG. 3 is a front view of the journal 11 and the guide bearing components 41 and 61. As illustrated in FIG. 3, the guide bearing component 41 includes a pressurizing chamber 41a (a fifth pressurizing chamber) and a bearing part 41b (a fifth bearing part).

The pressurizing chamber 41a is fixed to the non-illustrated structural object. A space containing a below-described fluid is formed within the pressurizing chamber 41a. The bearing part 41b is attached moveably to the pressurizing chamber 41a to enable movement in an axial direction parallel to the rotation shaft 10. Internal volume of the pressurizing chamber 41a increases and decreases in accordance with movement of the bearing part 41b. In other words, adjustment of an amount of the fluid within the pressurizing chamber 41a can determine the position of the bearing part 41b.

The bearing part 41b includes a bearing 41c and an axle 41d projecting from the bearing 41c in the positive X direction. The bearing 41c has bearings, such as roller bearings, that reduce friction of contact with the right-side surface 11R of the journal 11 even if the journal 11 rotates. The bearing 41c presses with an adjusted preloading against the right-side surface 11R of the journal 11. An end of the axle 41d is inserted into the pressurizing chamber 41a from an opening arranged in the pressurizing chamber 41a. An accordion-shaped component is arranged between the opening of the pressurizing chamber 41a and the distal end of the axle 41d. The accordion-shaped component partitions the exterior space from the fluid-filled inner space of the pressurizing chamber 41a. Even when the internal volume of the pressurizing chamber 41a changes, leakage of the fluid from the accordion-shaped component does not occur.

As seen upon referring to FIG. 2, the guide bearing components 31, 32, 42, 51, 52, 61, and 62 other than the guide bearing component 41 are equivalent to the guide bearing component 41, and each of these guide bearing components includes a respective pressurizing chamber and bearing component. Although reference symbols are not shown in FIG. 2, the guide bearing component 31 has a pressurizing chamber 31a (a first pressurizing chamber) and a bearing part 31b (a first bearing part). The guide bearing component 32 has a pressurizing chamber 32a (a second pressurizing chamber) and a bearing part 32b (a second bearing part). The guide bearing component 42 has a pressurizing chamber 42a (a sixth pressurizing chamber) and a bearing part 42b (a sixth bearing part). The guide bearing component 51 has a pressurizing chamber 51a (a third pressurizing chamber) and a bearing part 51b (a third bearing part). The guide bearing component 52 has a pressurizing chamber 52a (a fourth pressurizing chamber) and a bearing part 52b (a fourth bearing part). The guide bearing component 61 has a pressurizing chamber 61a (a seventh pressurizing chamber) and a bearing part 61b (a seventh bearing part). The guide bearing component 62 has a pressurizing chamber 62a (an eighth pressurizing chamber) and a bearing part 62b (an eighth bearing part).

As illustrated in FIG. 2, the connecting tube 33 (a first connecting tube) interconnects the guide bearing components 31 and 32 and the preloading mechanism 34. The connecting tube 33 is filled with the fluid. Similarly to the connecting tube 33, the connecting tube 43 (a third connecting tube) interconnects the guide bearing components 41 and 42 and the preloading mechanism 44.

The connecting tube 53 (a second connecting tube) interconnects the guide bearing components 51 and 52 and the positioning mechanism 54. The connecting tube 53 is filled with the fluid. Similarly to the connecting tube 53, the connecting tube 63 (a fourth connecting tube) interconnects the guide bearing components 61 and 62 and the positioning mechanism 64.

The preloading mechanism 34 is used for adjustment of magnitude of preloading applied to the journals 11 and 12 by the bearing parts 31b and 32b of the guide bearing components 31 and 32. The preloading mechanism 34, in addition to an internally formed cavity, includes a spring 34a. The cavity of the preloading mechanism 34 communicates through the connecting tube 33 with the pressurizing chambers 31a and 32a of the guide bearing components 31 and 32. Together with the interior of the connecting tube 33 and the pressurizing chambers 31a and 32a of the guide bearing components 31 and 32, the cavity of the preloading mechanism 34 is filled with the fluid. The spring 34a applies pressure in a direction so as to decrease the spatial volume of the cavity. By adjustment of the spring constant of the spring 34a, internal pressure of the pressurizing chambers 31a and 32a of the guide bearing components 31 and 32 is adjusted via the connecting tube 33, and magnitude of the preloading of the journals 11 and 12 is adjusted. The magnitude of the preloading applied by the bearing parts 51b and 52b of the guide bearing components 51 and 52 to the journals 11 and 12 is the same as the magnitude of the preloading applied by the bearing parts 31b and 32b of the guide bearing components 31 and 32 to the journals 11 and 12.

The preloading mechanism 44 is equivalent to the preloading mechanism 34, and is used for applying preloading to the journals 11 and 12 by the bearing components of the guide bearing components 41 and 42. The preloading mechanism 44, in addition to an internally formed cavity, includes a spring 44a. The cavity of the preloading mechanism 44 communicates through the connecting tube 43 with the pressurizing chambers 41a and 42a of the guide bearing components 41 and 42. Together with the interior of the connecting tube 43 and the pressurizing chambers 41a and 42a of the guide bearing components 41 and 42, the cavity of the preloading mechanism 44 is filled with the fluid. The spring 44a applies pressure in a direction so as to decrease the spatial volume of the cavity. At the preloading mechanism 44, by adjustment of the spring constant of the spring 44a, internal pressure of the pressurizing chambers 41a and 42a of the guide bearing components 41 and 42 is adjusted via the connecting tube 43, and magnitude of the preloading of the journals 11 and 12 is adjusted together with the preloading mechanism 34. The magnitude of the preloading applied by the bearing parts 61b and 62b of the guide bearing components 61 and 62 to the journals 11 and 12 is the same as the magnitude of the preloading applied by the bearing parts 41b and 42b of the guide bearing components 41 and 42 to the journals 11 and 12.

Figure 4:
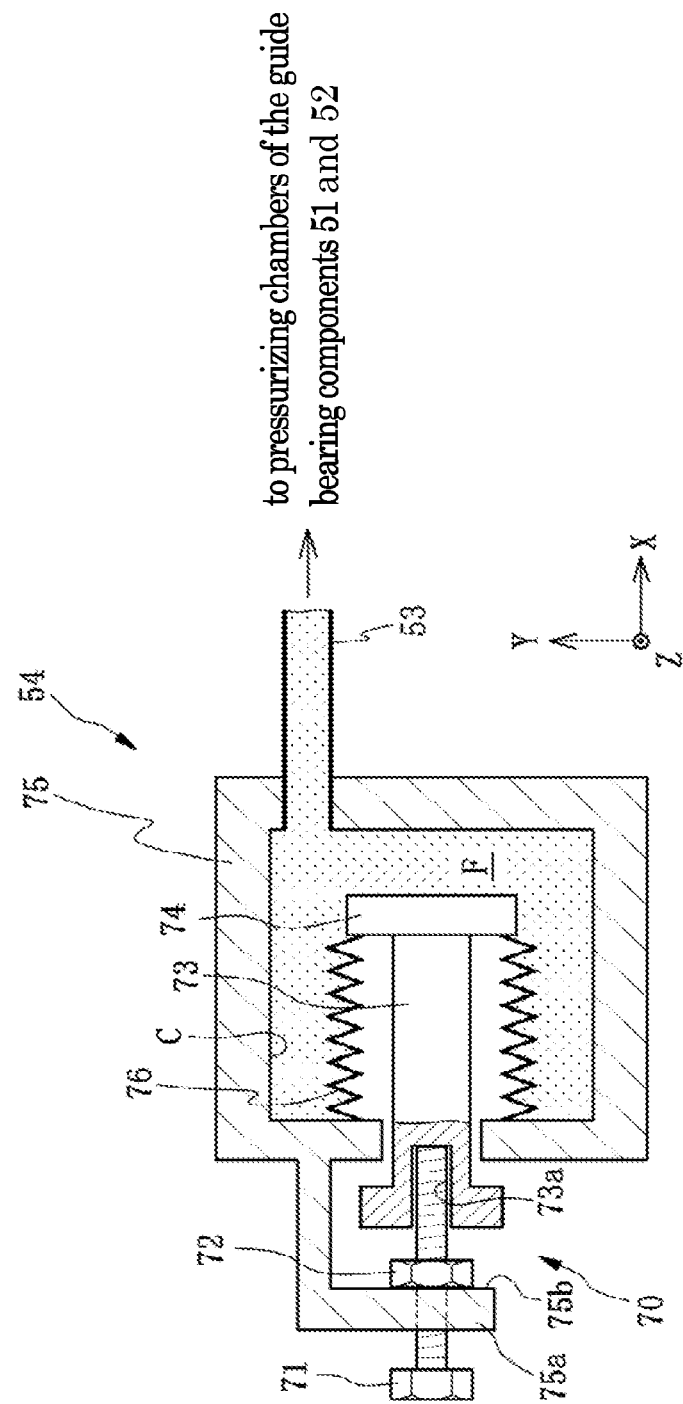
FIG. 4 is a cross-sectional view of a positioning mechanism of the preload guide system according to the embodiment.

The positioning mechanism 54 is used for determination of initial positions of the journals 11 and 12. The term "initial positions" refers to positions of the journals 11 and 12 used as standards for determining positional displacements of the journals 11 and 12. As illustrated in FIG. 4, the positioning mechanism 54 includes a jacking mechanism 70 and a positioning mechanism body 75 having a cavity C formed therein. The jacking mechanism 70 adjusts spatial volume of the cavity C. The cavity C communicates with the pressurizing chambers 51a and 52a of the guide bearing components 51 and 52 via the connecting tube 53. High pressure is applied to the cavity C. The positioning mechanism 54 is constructed such that the fluid does not leak even when the volume of the cavity C changes. Further, the volume of the cavity C changes due to movement of the head 74, which is a part of the jacking mechanism 70. The cavity C in the positioning mechanism 64, the cavities of the preload mechanisms 34 and 44, and the pressurizing chambers 31a, 32a, 41a, 42a, 51a, 52a, 61a, and 62a of the guide bearing components 31, 32, 41, 42, 51, 52, 61, and 62 are similar to those of the positioning mechanism 54. Together with the pressurizing chambers 51a and 52a of the guide bearing components 51 and 52 and the interior of the connecting tube 53, the cavity C is filled with the fluid F. The fluid F used in the preload guide system is preferably a mechanical actuation oil such as a mineral oil.

The jacking mechanism 70 includes a bolt 71, a nut 72, a rod 73, and a head 74. On the positioning mechanism body 75, a bent portion 75a is arranged that projects in the negative X direction from the positioning mechanism body 75 and bends in the negative Z direction. A through hole is formed in the bent portion 75a. A nut 72 is fixed to the positive X-side surface 75b of the bent portion 75a. The nut 72 has a bolt hole that communicates with the through hole. The bolt 71 is inserted into the through hole and the bolt hole of the nut 72. Male threads arranged on the outer surface of the shaft of the bolt 71 engage female threads arranged at the inner surface of the bolt hole of the nut 72. A hole 73a for insertion of the bolt 71 is formed at an end surface on the rearward-end side (negative X-side) of the rod 73. The rod 73 is inserted into the opening arranged in the positioning mechanism body 75 and is capable of moving in both the positive X direction and the negative X direction. The head 74 is fixed to an end portion (positive X-side end portion) of the rod 73. An accordion-shaped movable partition wall 76 partitioning off the interior of the cavity C from the exterior is arranged between the head 74 and the inner surface of the positioning mechanism body 75. By screwing of the bolt 71 into and out of the nut 72, the head 74 is moved in both the positive X direction and the negative X direction, and the spatial volume of the cavity C is adjusted. This action adjusts the amount of the fluid within the pressurizing chambers 51a and 52a of the guide bearing components 51 and 52 via the connecting tube 53, and determines the positions of the journals 11 and 12.

As illustrated in FIG. 2, the positioning mechanism 64 is equivalent to the positioning mechanism 54, and has the jacking mechanism 70 and a positioning mechanism body 75 having a cavity C formed therein. The positioning mechanism 64, together with the positioning mechanism 54, is used for determination of initial positions of the journals 11 and 12.

The journals 11 and 12 are each supported at one side (left-side surface 11L, 12L) thereof by the support system 50 (a second support positioning mechanism) that includes the positioning mechanism 54 and the support system 60 (a fourth support positioning mechanism) that includes the positioning mechanism 64, thereby enabling positioning of the journals 11 and 12 around the Z axis and in the X direction. The journals 11 and 12 are each supported at the opposite sides (right-side surfaces 11R and 12R) thereof by the support systems 30 and 40 that include the preloading mechanisms 34 and 44, thereby enabling support of the journals 11 and 12 by fixed preloading of the journals 11 and 12 at positions determined by the positioning mechanisms 54 and 64.

In the preload guide system 20 configured in the aforementioned manner, the support system 30 (a first support positioning mechanism) supports the journals 11 and 12 at the same circumferential direction positions of the journals 11 and 12 by the guide bearing components 31 and 32 so as to compensate for the axial-direction movement amount (displacement amount) of the guide bearing components 31 and 32 of the right-side surfaces 11R and 12R of the same sides in the axial-direction.

The support system 40 (a third support positioning mechanism) supports the journals 11 and 12 at the same circumferential direction positions of the journals 11 and 12 by the guide bearing components 41 and 42 so as to compensate for the axial-direction movement amount (displacement amount) of the guide bearing components 41 and 42 of the right-side surfaces 11R and 12R of the same sides in the axial-direction.

The support system 50 supports the journals 11 and 12 at the same circumferential direction positions of the journals 11 and 12 by the guide bearing components 51 and 52 so as to compensate for the axial-direction movement amount (displacement amount) of the guide bearing components 51 and 52 of the left-side surfaces 11L and 12L of the same sides in the axial-direction.

The support system 60 supports the journals 11 and 12 at the same circumferential direction positions of the journals 11 and 12 by the guide bearing components 61 and 62 so as to compensate for the axial-direction movement amount (displacement amount) of the guide bearing components 61 and 62 of the left-side surfaces 11L and 12L of the same sides in the axial-direction.

Further, the compensation in the present disclosure includes enabling the guide bearing components at equivalent positions with respect to each of the journals 11 and 12 to operate cooperatively such that the sum of the movement amounts (displacement amounts) of the guide bearing components with respect to the journals becomes zero.

Operation of the preload guide system 20 is described hereinafter with reference to FIG. 5 to FIG. 7.

In the rotation structure 1, the journals 11 and 12 may deform due to factors such as temperature change and weight of the rotation structure 1. FIG. 5 is a schematic drawing for description of operation performed by the preload guide system 20 when the rotation structure 1 deforms such that the journals 11 and 12 move in either the positive X direction or the negative X direction due to temperature of the rotation structure 1 becoming high.

Figure 5:
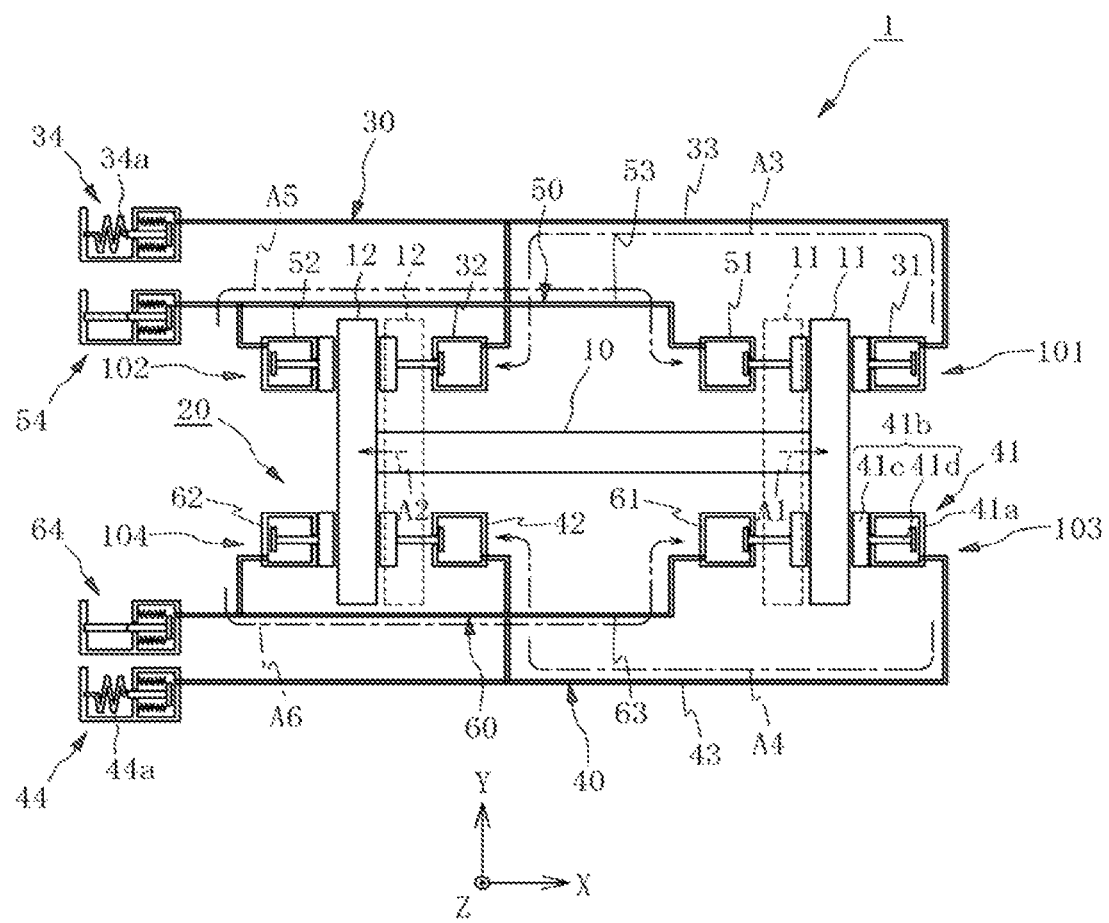
FIG. 5 is a schematic drawing (first of three) for description of operation of the preload guide system according to the embodiment.

For example, when the rotation structure 1 deforms such that the journal 11 moves in the positive X direction (direction indicated by an arrow A1) as illustrated in FIG. 5, at the support system 30, the bearing part 31*b* of the guide bearing component 31 moves in the positive X direction. This decreases the volume of the pressurizing chamber 31*a* of the guide bearing component 31. The volume of the fluid sealed in the interior of the connecting tube 33 and other components is fixed, and thus the fluid within the pressurizing chamber 31*a* flows into the pressurizing chamber 32*a* of the guide bearing component 32 via the connecting tube 33 as indicated by an arrow A3. Thus the bearing part 32*b* of the guide bearing component 32 is pressed outward in the negative X direction. This results in adjustment of the journal 12 so as to cause movement in the negative X direction (arrow A2).

In the same manner, at the support system 40, the bearing part 41*b* of the guide bearing component 41 moves in the positive X direction. This decreases the volume of the pressurizing chamber 41*a* of the guide bearing component 41. The volume of the fluid of the interior of the connecting tube 43 and other components is fixed, and thus the fluid within the pressurizing chamber 41*a* flows into the pressurizing chamber 42*a* of the guide bearing component 42 via the connecting tube 43 as indicated by arrow A4. Thus the bearing part 42*b* of the guide bearing component 42 is pressed outward in the negative X direction. This results in adjustment of the journal 12 so as to cause movement in the negative X direction (arrow A2).

In the above-described manner, when the rotation structure 1 deforms so as to move the journal 11 in the positive X direction (arrow A1), the support systems 30 and 40 cause adjustment of the journal 12 so as to move in the negative X direction (arrow A2). Due to interconnection of the journals 11 and 12 by the rotation shaft 10, the direction of movement of the journal 12 is opposite to the direction of movement of the journal 11, and thus movement is corrected so that rotation structure 1 returns to the determined position.

Next, when the rotation structure 1 deforms such that the journal 12 moves in the negative X direction (arrow A2), by the support system 50, the bearing part 52*b* of the guide bearing component 52 moves in the negative X direction. Upon such movement, volume of the pressurizing chamber 52*a* of the guide bearing component 52 decreases. Due to the volume of the fluid within the connecting tube 53 and other components being fixed, the fluid within the pressurizing chamber 52*a* flows into the pressurizing chamber 51*a* of the guide bearing component 51 via the connecting tube 53 as indicated by the arrow A5. The bearing part 51*b* of the guide bearing component 51 is pressed outward by this means in the positive X direction. This results in adjustment such that the journal 11 moves in the positive X direction (arrow A1).

In the same manner, at the support system 60, the bearing part 62*b* of the guide bearing component 62 moves in the negative X direction. Upon such movement, volume of the pressurizing chamber 62*a* of the guide bearing component 62 decreases. Due to the volume of the fluid within the connecting tube 63 and other components being fixed, the fluid within the pressurizing chamber 62*a* flows into the pressurizing chamber 61*a* of the guide bearing component 61 via the connecting tube 63 as indicated by the arrow A6. The bearing part 61*b* of the guide bearing component 61 is pressed outward by this means in the positive X direction. This results in adjustment so that the journal 11 moves in the positive X direction (arrow A1).

In the above-described manner, when the rotation structure 1 deforms so as to move the journal 12 in the negative X direction (arrow A2), the support systems 50 and 60 cause adjustment of the journal 11 so as to move in the positive X direction (arrow A1). Due to interconnection of the journals 11 and 12 by the rotation shaft 10, the direction of the movement of the journal 11 is opposite to the direction of movement of the journal 12, and thus movement is corrected so that the rotation structure 1 returns to the determined position, and is maintained at a predetermined initial position with respect to the X axis direction.

Figure 6:
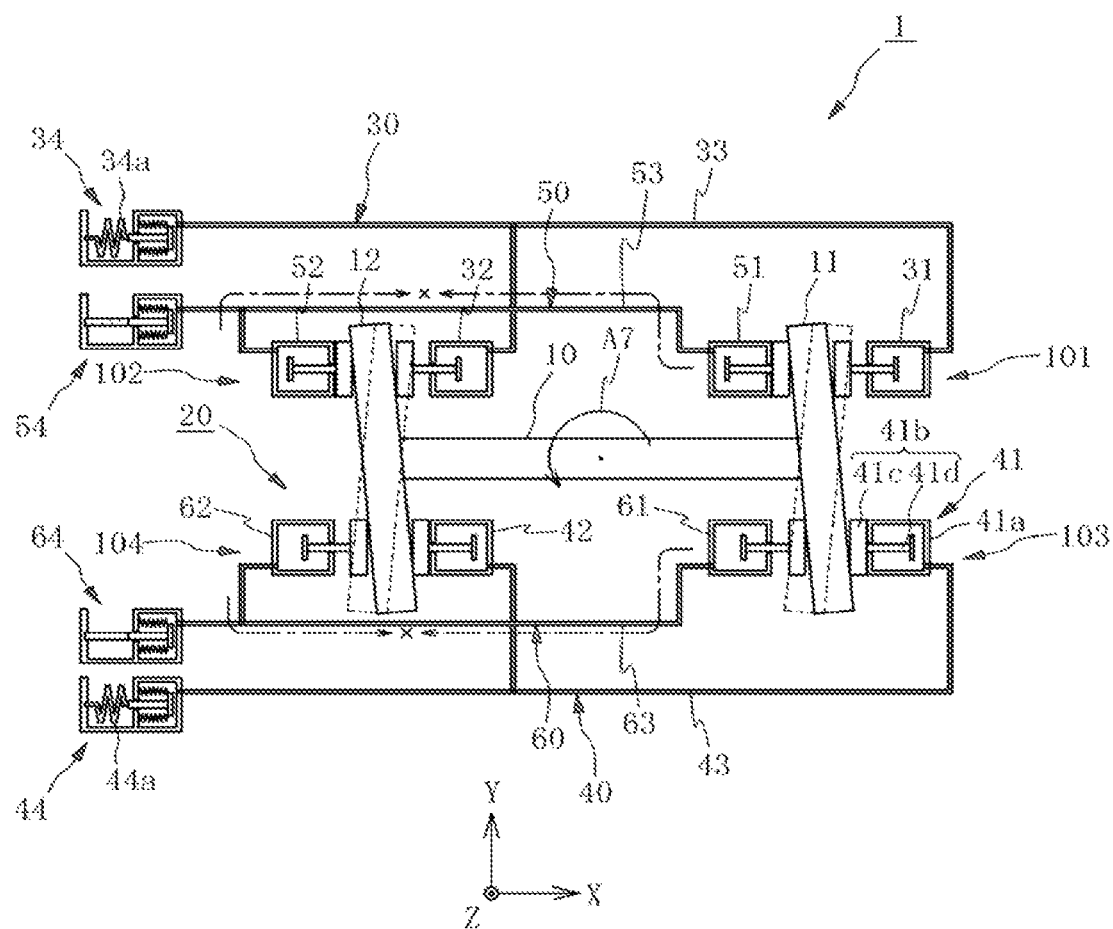
FIG. 6 is a schematic drawing (second of three) for description of operation of the preload guide system according to the embodiment.
Figure 7:
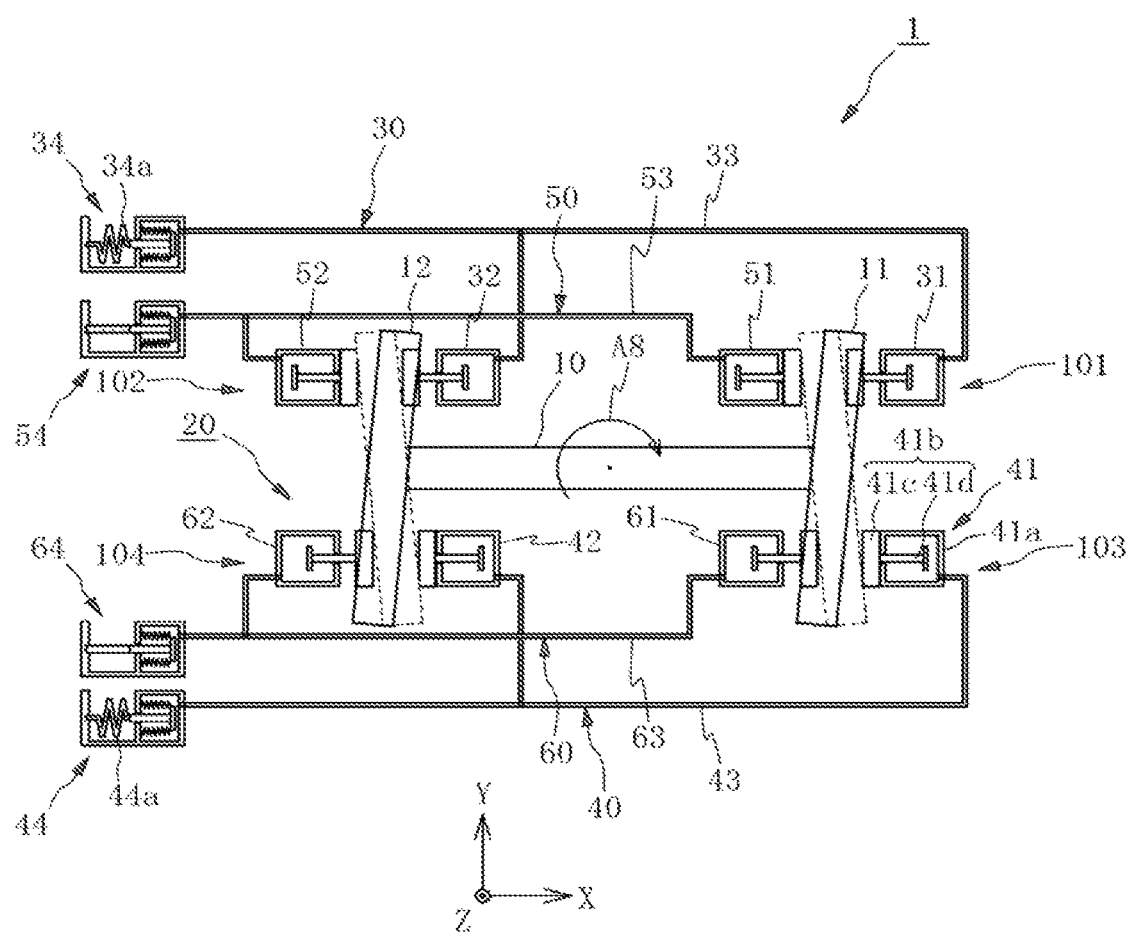
FIG. 7 is a schematic drawing (third of three) for description of operation of the preload guide system according to the embodiment.

FIG. 6 and FIG. 7 are schematic drawings for description of operation of the preload guide system 20 in the case in which the rotation structure 1 deforms so that the journals 11 and 12 rotate around the Z axis.

For example, in the case of deformation of the rotation structure 1 so that the journals 11 and 12 rotate in the counter-clockwise direction (arrow A7) in a plan view as illustrated in FIG. 6, by the support system 40, the bearing part 41*b* of the guide bearing component 41 and the bearing part 42*b* of the guide bearing component 42 attempt simultaneously to move in the positive X direction. However, the volume of fluid within the connecting tube 43 and other components is fixed, thus the bearing part 41*b* of the guide bearing component 41 and the bearing part 42*b* of the guide bearing component 42 do not move in the positive X direction, and thus rotation of the journals 11 and 12 is restricted.

In the same manner, at the support system 50, the bearing components of the guide bearing components 51 and 52 attempt to move simultaneously in the negative X direction. However, the volume of fluid within the connecting tube 53 and other components is fixed, thus the bearing part 51$b$ and 52$b$ of the guide bearing components 51 and 52 do not move in the negative X direction, and thus rotation of the journals 11 and 12 is restricted.

Further, as illustrated in FIG. 7, if the rotation structure 1 deforms such that the journals 11 and 12 rotate clockwise (arrow A8) in a plan view, by the support system 30, the bearing part 31$b$ of the guide bearing component 31 and the bearing part 32$b$ of the guide bearing component 32 attempt to move simultaneously in the positive X direction. However, the volume of fluid within the connecting tube 33 and other components is fixed, thus the bearing part 31$b$ of the guide bearing component 31 and the bearing part 32$b$ of the guide bearing component 32 do not move in the positive X direction, and thus rotation of the journals 11 and 12 is restricted.

In a similar manner, at the support system 60, the bearing part 61$b$ of the guide bearing component 61 and the bearing part 62$b$ of the guide bearing component 62 attempt to move simultaneously in the negative X direction. However, the volume of fluid within the connecting tube 63 and other components is fixed, thus the bearing part 61$b$ of the guide bearing component 61 and the bearing part 62$b$ of the guide bearing component 62 do not move in the negative X direction, and thus rotation of the journals 11 and 12 is restricted.

In the above described manner, in the case of deformation of the rotation structure 1 such that the journals 11 and 12 rotate around the Z axis (arrows A7 and A8), that is, rotate in the horizontal plane, the rotation of the journals 11 and 12 is restricted by the support systems 30, 40, 50, and 60. Thus the rotation structure 1 is maintained at a prescribed initial position with respect to rotation around the Z axis.

As described above, the preload guide system 20 according to the present embodiment includes, as four independent support positioning mechanisms, the support systems 30, 40, 50, and 60, and includes the preloading mechanisms 34 and 44, and the positioning mechanisms 54 and 64. The support system 30 includes the preloading mechanism 34, and the support system 40 includes the preloading mechanism 44. The support system 50 includes the positioning mechanism 54, and the support system 60 includes the positioning mechanism 64. The support system 30 adjusts the displacement amounts of the guide bearing components 31 and 32 such that the sum of the displacement amounts of the guide bearing components 31 and 32 becomes zero, the support system 40 adjusts the displacement amounts of the guide bearing components 41 and 42 such that the sum of the displacement amounts of the guide bearing components 41 and 42 becomes zero, the support system 50 adjusts the displacement amounts of the guide bearing components 51 and 52 such that the sum of the displacement amounts of the guide bearing components 51 and 52 becomes zero, and the support system 60 adjusts the displacement amounts of the guide bearing components 61 and 62 such that the sum of the displacement amounts of the guide bearing components 61 and 62 becomes zero. Thus in addition to the case in which the rotation structure 1 deforms such that the journals 11 and 12 move in either the positive X direction or negative X direction, the rotation structure 1 can be maintained at a prescribed initial position even in the case in which deformation occurs such that the journals 11 and 12 rotate around the Z axis. This has the effect of enabling prevention of positional displacement of the journals 11 and 12.

Hereinafter, a positioning mechanism 54A according to a modified example of the embodiment of the present disclosure is described with reference to FIG. 8.

Figure 8:
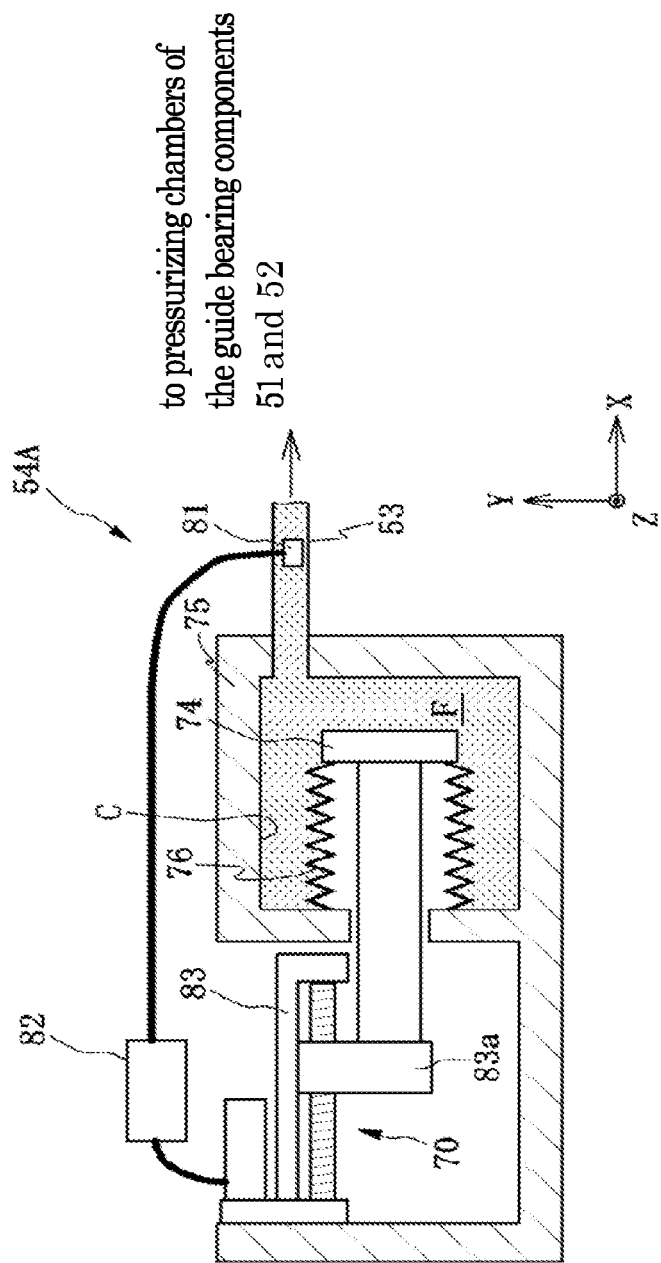
FIG. 8 is a cross-sectional view of the positioning mechanism of the preload guide system according to a modified example of the embodiment.

As illustrated in FIG. 8, the positioning mechanism MA controls movement of the head 74 on the basis of temperature of the fluid F. That is to say, in addition to the jacking mechanism 70, the positioning mechanism 54A further includes a temperature sensor 81, a controller 82, and an actuator 83.

The temperature sensor 81, for example, is disposed within the connecting tube 53 and senses temperature changes that may cause volumetric expansion or contraction of the fluid F within the support system 30.

The controller 82, on the basis of the results of sensing by the temperature sensor 81, calculates an amount of temperature-change-induced volumetric expansion or contraction of the fluid within the bearing support system. The controller 82 determines a volume of the cavity C in the positioning mechanism 54A such that the positions of the guide bearing components 51 and 52 do not change even through there is volumetric expansion or contraction of the fluid. The controller 82 controls the movable part 83$a$ of the actuator 83 to move in the positive X direction or negative X direction so that the volume of the cavity C becomes the determined volume. The head 74 is supported so as to move together with the movable part 83$a$. The head 74 adjusts the volume of the space of the cavity C, thereby adjusting internal pressure of the pressurizing chambers 51$a$ and 52$a$ of the guide bearing components 51 and 52 via the connecting tube 53, and determining the positions of the journals 11 and 12. The positioning mechanism 64A is configured in the same manner as the positioning mechanism 54A and operates in a similar manner.

Due to such operation, while the preloading mechanisms 34 and 44 press the journals 11 and 12 at a given pressure from the sides opposite to the sides of the journals 11 and 12 pressed by the positioning mechanisms 54A and 64A, even when volumetric expansion or contraction of the fluid occurs due to temperature change, the positions of the guide bearing components 41, 42, 61, and 62 are maintained constant, and positional displacement of the rotation structure 1 in the direction of the rotation axis (X axis) can be prevented.

In the modified example of the embodiment of the present disclosure, due to automatic positioning of the rotation structure 1 on the basis of temperature of the fluid F, the controller 82 can appropriately position the rotation structure 1.

Although embodiments of the present disclosure are described above, the present disclosure is not limited to the aforementioned embodiments.

For example, in the aforementioned embodiments of the present disclosure, the rotation structure 1 includes four independent support systems 30, 40, 50, and 60. However, the present disclosure is not limited to this configuration. The rotation structure 1 may include five or more independent support systems.

The foregoing describes some example embodiments for explanatory purposes. Although the foregoing discussion has presented specific embodiments, persons skilled in the art will recognize that changes may be made in form and detail without departing from the broader spirit and scope of the disclosure. Accordingly, the specification and drawings are to be regarded in an illustrative rather than a restrictive sense. This detailed description, therefore, is not to be taken in a limiting sense, and the scope of the disclosure is defined only by the included claims, along with the full range of equivalents to which such claims are entitled.

What is claimed is:

1. A preload guide system for guiding movement in a horizontal plane of a rotation structure rotating around a rotation axis, and having a first journal arranged perpendicular to the rotation axis and a second journal disposed at a predetermined spacing in a direction of the rotation axis from the first journal and arranged perpendicular to the rotation axis, the preload guide system comprising:
    a first guide bearing component to press a predetermined position of a first side surface of the first journal and rotatably support the first journal, the first side surface being at the side of the first journal at which the second journal does not exist,
    a second guide bearing component to press a predetermined position of a second side surface of the first journal and rotatably support the first journal, the second side surface being at the side of the first journal at which the second journal exists, the predetermined position of the second side surface corresponding to the predetermined position pressed by the first guide bearing component,
    a third guide bearing component to press a predetermined position of the first side surface and rotatably support the first journal, the predetermined position being opposite to the predetermined position pressed by the first guide bearing component with respect to an axial-direction reference plane that is a vertical plane including the rotation axis,
    a fourth guide bearing component to press a predetermined position of the second side surface and rotatably support the first journal, the predetermined position of the second side surface corresponding to the predetermined position pressed by the third guide bearing component,
    a fifth guide bearing component to press a predetermined position of a third side surface of the second journal and rotatably support the second journal, the third side surface being at the side of the second journal at which the first journal exists, the predetermined position being at the same side as the predetermined position pressed by the first guide bearing component with respect to the axial-direction reference plane,
    a sixth guide bearing component to press a predetermined position of a fourth side surface of the second journal and rotatably support the second journal, the fourth side surface being at the side of the second journal at which the first journal does not exist, the predetermined position of the fourth side surface corresponding to the predetermined position pressed by the fifth guide bearing component,
    a seventh guide bearing component to press a predetermined position of the third side surface and rotatably support the second journal, the predetermined position of the third side surface being opposite to the predetermined position pressed by the fifth guide bearing component with respect to the axial-direction reference plane,
    an eighth guide bearing component to press a predetermined position of the fourth side surface and rotatably support the second journal, the predetermined position of the fourth side surface corresponding to the predetermined position pressed by the seventh guide bearing component,
    a first support positioning mechanism to adjust a displacement amount of the first guide bearing component and a displacement amount of the fifth guide bearing component such that a sum of the displacement amount of the first guide bearing component and the displacement amount of the fifth guide bearing component becomes zero,
    a second support positioning mechanism to adjust a displacement amount of the second guide bearing component and a displacement amount of the sixth guide bearing component such that a sum of the displacement amount of the second guide bearing component and the displacement amount of the sixth guide bearing component becomes zero,
    a third support positioning mechanism to adjust a displacement amount of the third guide bearing component and a displacement amount of the seventh guide bearing component such that a sum of the displacement amount of the third guide bearing component and the displacement amount of the seventh guide bearing component becomes zero, and
    a fourth support positioning mechanism to adjust the displacement amount of the fourth guide bearing component and a displacement amount of the eighth guide bearing component such that a sum of the displacement amount of the fourth guide bearing component and the displacement amount of the eighth guide bearing component becomes zero.

2. The preload guide system according to claim 1, further comprising:
    a first connecting tube, a second connecting tube, a third connecting tube, and a fourth connecting tube, wherein
    the first guide bearing component comprises (i) a first bearing part to press the first side surface of the first journal, and (ii) a first pressurizing chamber being attached with the first bearing part movably in an axial direction parallel to the rotation axis, movement of the first bearing part causing an internal volume of the first pressurizing chamber to be increased or decreased,
    the fifth guide bearing component comprises (i) a second bearing part to press the third side surface of the second journal, and (ii) a second pressurizing chamber being attached with the second bearing part movably in the axial direction, movement of the second bearing part causing an internal volume of the second pressurizing chamber to be increased or decreased,
    the first pressurizing chamber and the second pressurizing chamber communicate via the first connecting tube,
    the first pressurizing chamber, the second pressurizing chamber, and the first connecting tube are to seal therein a fluid,
    when movement of the first journal or the second journal from a predetermined position thereof causes a change in the internal volume of the first pressurizing chamber or the second pressurizing chamber, the first support positioning mechanism makes the second bearing part or the first bearing part move in accordance with the change in the internal volume to adjust the displacement amount of the first guide bearing component and the displacement amount of the fifth guide bearing component such that the sum of the displacement amount of the first guide bearing component and the displacement amount of the fifth guide bearing component becomes zero,
    the second guide bearing component comprises (i) a third bearing part to press the second side surface of the first journal, and (ii) a third pressurizing chamber being attached with the third bearing part movably in the axial direction, movement of the third bearing part causing an internal volume of the third pressurizing chamber to be increased or decreased, the sixth guide bearing component comprises (i) a fourth bearing part to press the fourth side surface of the second journal, and (ii) a fourth pressurizing chamber being attached with the fourth bearing part movably in the axial direction, movement of the fourth bearing part causing an internal volume of the fourth pressurizing chamber to be increased or decreased, the third pressurizing chamber and the fourth pressurizing chamber communicate via the second connecting tube, the third pressurizing chamber, the fourth pressurizing chamber, and the second connecting tube are to seal therein the fluid, when movement of the first journal or the second journal from the predetermined position thereof causes a change in the internal volume of the third pressurizing chamber or the fourth pressurizing chamber, the second support positioning mechanism makes the fourth bearing part or the third bearing part move in accordance with the change in the internal volume to adjust the displacement amount of the second guide bearing component and the displacement amount of the sixth guide bearing component such that the sum of the displacement amount of the second guide bearing component and the displacement amount of the sixth guide bearing component becomes zero, the third guide bearing component comprises (i) a fifth bearing part to press the first side surface of the first journal, and (ii) a fifth pressurizing chamber being attached with the fifth bearing part movably in the axial direction, movement of the fifth bearing part causing an internal volume of the fifth pressurizing chamber to be increased or decreased, the seventh guide bearing component comprises (i) a sixth bearing part to press the third side surface of the second journal, and (ii) a sixth pressurizing chamber being attached with the sixth bearing part movably in the axial direction, movement of the sixth bearing part causing an internal volume of the sixth pressurizing chamber to be increased or decreased, the fifth pressurizing chamber and the sixth pressurizing chamber communicate via the third connecting tube, the fifth pressurizing chamber, the sixth pressurizing chamber, and the third connecting tube are to seal therein the fluid, when movement of the first journal or the second journal from the predetermined position thereof causes a change in the internal volume of the fifth pressurizing chamber or the sixth pressurizing chamber, the third support positioning mechanism makes the sixth bearing part or the fifth bearing part move in accordance with the change in the internal volume to adjust the displacement amount of the third guide bearing component and the displacement amount of the seventh guide bearing component such that the sum of the displacement amount of the third guide bearing component and the displacement amount of the seventh guide bearing component becomes zero, the fourth guide bearing component comprises (i) a seventh bearing part to press the second side surface of the first journal, and (ii) a seventh pressurizing chamber being attached with the seventh bearing part movably in the axial direction, movement of the seventh bearing part causing an internal volume of the seventh pressurizing chamber to be increased or decreased, the eighth guide bearing component comprises (i) an eighth bearing part to press the fourth side surface of the second journal, and (ii) an eighth pressurizing chamber being attached with the eighth bearing part movably in the axial direction, movement of the eighth bearing part causing an internal volume of the eighth pressurizing chamber to be increased or decreased, the seventh pressurizing chamber and the eighth pressurizing chamber communicate via the fourth connecting tube, the seventh pressurizing chamber, the eighth pressurizing chamber, and the fourth connecting tube are to seal therein the fluid, and when movement of the first journal or the second journal from the predetermined position thereof causes a change in the internal volume of the seventh pressurizing chamber or the eighth pressurizing chamber, the fourth support positioning mechanism makes the eighth bearing part or the seventh bearing part move in accordance with the change in the internal volume to adjust the displacement amount of the fourth guide bearing component and the displacement amount of the eighth guide bearing component such that the sum of the displacement amount of the fourth guide bearing component and the displacement amount of the eighth guide bearing component becomes zero.

3. The preload guide system according to claim 2, wherein each of the first support positioning mechanism and the third support positioning mechanism includes a preloading mechanism to regulate preloading for constraining each of the first journal and the second journal.

4. The preload guide system according to claim 3, wherein each of the second support positioning mechanism and the fourth support positioning mechanism includes a positioning mechanism to determine a position of each of the first journal and the second journal.

5. The preload guide system according to claim 4, wherein each of the positioning mechanisms comprises (i) a positioning mechanism body having formed therein a cavity to seal therein a fluid, and (ii) a jacking mechanism to increase and decrease a volume of the cavity.

6. The preload guide system according to claim 4, wherein each positioning mechanism of the positioning mechanisms comprises:
a positioning mechanism body having formed therein a cavity to seal therein a fluid,
a temperature sensor for detecting a temperature of the fluid,
a jacking mechanism to increase and decrease a volume of the cavity,
an actuator to move the jacking mechanism, and
a controller to control the actuator based on the temperature detected by the temperature sensor.

7. The preload guide system according to claim 2, wherein each of the second support positioning mechanism and the fourth support positioning mechanism includes a positioning mechanism to a determine position of each of the first journal and the second journal.

8. The preload guide system according to claim 7, wherein each positioning mechanism of the positioning mechanisms comprises (i) a positioning mechanism body having formed therein a cavity to seal therein a fluid, and (ii) a jacking mechanism to increase and decrease a volume of the cavity.

9. The preload guide system according to claim 7, wherein
each positioning mechanism of the positioning mechanisms comprises:
a positioning mechanism body having formed therein a cavity to seal therein a fluid,
a temperature sensor for detecting a temperature of the fluid,
a jacking mechanism to increase and decrease a volume of the cavity,
an actuator to move the jacking mechanism, and
a controller to control the actuator based on the temperature detected by the temperature sensor.

10. The rotation structure comprising the preload guide system according to claim 2.

11. The preload guide system according to claim 1, wherein
each of the first support positioning mechanism and the third support positioning mechanism includes a preloading mechanism to regulate preloading for constraining each of the first journal and the second journal.

12. The preload guide system according to claim 11, wherein
each of the second support positioning mechanism and the fourth support positioning mechanism includes a positioning mechanism to determine a position of each of the first journal and the second journal.

13. The preload guide system according to claim 12, wherein each of the positioning mechanisms comprises (i) a positioning mechanism body having formed therein a cavity to seal therein a fluid, and (ii) a jacking mechanism to increase and decrease a volume of the cavity.

14. The rotation structure comprising the preload guide system according to claim 13.

15. The preload guide system according to claim 12, wherein
each positioning mechanism of the positioning mechanisms comprises:
a positioning mechanism body having formed therein a cavity to seal therein a fluid,
a temperature sensor for detecting a temperature of the fluid,
a jacking mechanism to increase and decrease a volume of the cavity,
an actuator to move the jacking mechanism, and
a controller to control the actuator based on the temperature detected by the temperature sensor.

16. The rotation structure comprising the preload guide system according to claim 15.

17. The preload guide system according to claim 1, wherein
each of the second support positioning mechanism and the fourth support positioning mechanism includes a positioning mechanism to determine a position of each of the first journal and the second journal.

18. The preload guide system according to claim 17, wherein each of the positioning mechanisms comprises (i) a positioning mechanism body having formed therein a cavity to seal therein a fluid, and (ii) a jacking mechanism to increase and decrease a volume of the cavity.

19. The preload guide system according to claim 17, wherein
each positioning mechanism of the positioning mechanisms comprises:
a positioning mechanism body having formed therein a cavity to seal therein a fluid,
a temperature sensor for detecting a temperature of the fluid,
a jacking mechanism to increase and decrease a volume of the cavity,
an actuator to move the jacking mechanism, and
a controller to control the actuator based on the temperature detected by the temperature sensor.

20. The rotation structure comprising the preload guide system according to claim 1.

* * * * *